US008302526B2

(12) United States Patent
Fukui et al.

(10) Patent No.: US 8,302,526 B2

(45) Date of Patent: Nov. 6, 2012

(54) SEALING STRUCTURE FOR FLUID PRESSURE DEVICE

(75) Inventors: Chiaki Fukui, Abiko (JP); Kazuyoshi Takahashi, Koto-ku (JP); Atsushi Tamai, Moriya (JP)

(73) Assignee: SMC Kabushiki Kaisha, Tokyo (JP)

( * ) Notice: Subject to any disclaimer, the term of this patent is extended or adjusted under 35 U.S.C. 154(b) by 919 days.

(21) Appl. No.: 12/439,599

(22) PCT Filed: Aug. 30, 2007

(86) PCT No.: PCT/JP2007/066870

§ 371 (c)(1), (2), (4) Date: Mar. 2, 2009

(87) PCT Pub. No.: WO2008/029699

PCT Pub. Date: Mar. 13, 2008

(65) Prior Publication Data

US 2009/0260516 A1 Oct. 22, 2009

(30) Foreign Application Priority Data

Sep. 4, 2006 (JP) ................................ 2006-238803

(51) Int. Cl.
*F16J 15/32* (2006.01)

(52) U.S. Cl. ........................................................ 92/168

(58) Field of Classification Search ..................... 92/168
See application file for complete search history.

(56) References Cited

U.S. PATENT DOCUMENTS

| | | | |
|---|---|---|---|
| 5,241,896 A | 9/1993 | Braun et al. | |
| 5,513,556 A * | 5/1996 | Schaefer | 92/168 |

FOREIGN PATENT DOCUMENTS

| | | |
|---|---|---|
| CN | 1824968 A | 8/2006 |
| DE | 103 49 917 A1 | 5/2005 |
| JP | 38 3860 | 4/1963 |
| JP | 4 4562 | 1/1992 |
| JP | 5 25066 | 4/1993 |
| JP | 5 96636 | 12/1993 |
| JP | 7 332313 | 12/1995 |
| JP | 9 217708 | 8/1997 |
| JP | 9 303320 | 11/1997 |
| JP | 10 2304 | 1/1998 |
| JP | 2000 9106 | 1/2000 |
| JP | 2001 355739 | 12/2001 |
| JP | 2003 156002 | 5/2003 |
| JP | 2006-234083 A | 9/2006 |
| JP | 2006-234084 A | 9/2006 |

* cited by examiner

*Primary Examiner* — Daniel Lopez

(74) *Attorney, Agent, or Firm* — Oblon, Spivak, McClelland, Maier & Neustadt, L.L.P.

(57) ABSTRACT

A sealing mechanism is mounted at an end section of a cylinder tube, which configures a cylinder device, by having a step section in between, and the sealing mechanism is sandwiched between the cylinder tube and a rod cover. The sealing mechanism includes a thin plate formed of a metal material, and a sealing member attached to one side surface of the plate. The plate and the sealing member are integrally arranged.

9 Claims, 7 Drawing Sheets

10

SEALING STRUCTURE FOR FLUID PRESSURE DEVICE

TECHNICAL FIELD

The present invention relates to a sealing (seal) structure used in a fluid pressure device, in which a piston is displaceable along an axial direction under the action of a pressure fluid supplied.

BACKGROUND ART

Heretofore, fluid pressure devices have been used as actuating mechanisms for transporting and positioning workpieces, and for driving various types of industrial machines. As one such fluid pressure device, in Japanese Laid-Open Patent Publication No. 10-002304, the present applicant has proposed a fluid pressure device equipped with a piston, which is displaceable under a pressing action from a pressure fluid.

The fluid pressure device comprises a piston, which is displaceable inside of a tubular shaped cylinder body, with a piston rod being connected to the piston. In addition, both ends forming openings of the cylinder body are closed respectively by cover members. Further, a piston rod penetrates through a hole provided in one of the cover members, wherein the cylinder body is maintained in an airtight condition by a packing member installed on the inner circumferential surface of the hole. Furthermore, the piston rod is slidably held through means of a bush. On the other hand, o-rings are installed into annular grooves on the cover members, so that through abutment of the o-rings against the inner wall surface of the cylinder body, the interior of the cylinder body is kept airtight.

DISCLOSURE OF THE INVENTION

A general object of the present invention is to provide a seal structure for a fluid pressure device, which is capable of simplifying the structure and improving assembly thereof with respect to the fluid pressure device.

In the seal structure for a fluid pressure device according to the present invention, a piston is displaced along a cylinder chamber under action of a pressure fluid supplied to the cylinder chamber of a cylinder tube, for maintaining airtightness of the cylinder chamber, the seal structure being equipped with a seal member being installed in an opening end of the cylinder tube, the seal member including a first seal element gripped between the cylinder tube and a cover member that closes the opening end, and a second seal element surrounding an outer circumferential surface of a piston rod connected to the piston, wherein the seal member is formed from an elastic material.

In this manner, the seal member, which is formed from an elastic material, is installed between the opening end of the cylinder tube and the cover member constituting the fluid pressure device. The first seal element is gripped between the cylinder tube and the cover member, whereas the second seal element surrounds and abuts with the outer circumferential surface of the piston rod. Owing to the first seal element, a seal is formed between the cylinder tube and the cover member, and the pressure fluid is prevented from leaking to the outside. Also, owing to the second seal element, a seal is formed between the piston rod and the cover member, whereby the pressure fluid can be prevented from leaking to the outside.

Accordingly, leakage of pressure fluid from between the cylinder tube and the cover member, as well as leakage of pressure fluid from between the cover member and the piston rod, can be prevented by the single seal member made up of the first and second seal elements. As a result, compared with the conventional fluid pressure device in which airtightness is maintained by separately providing a packing and o-rings, the number of parts can be reduced, and since the seal member has an integral structure, assembly thereof onto the fluid pressure device can be simplified.

Further, the seal member is installed integrally on a base body formed in a plate shape, and is gripped together with the base body between the cover member and the cylinder tube. Accordingly, handling of the seal member that is formed from an elastic material is facilitated, and assembly of the seal member with respect to the fluid pressure device can be improved.

Furthermore, the first seal element is formed with a protrusion, which projects toward at least one of the cylinder tube and the cover member. By means thereof, it is possible for the protrusion to more reliably come into abutment against at least one of the cylinder tube and the cover member. As a result, leakage of pressure fluid from between the cylinder tube and the cover member is prevented appropriately, and airtightness of the cylinder chamber can be maintained even more securely.

Still further, the second seal element is formed with lips that project toward and abut against an outer circumferential surface of the piston rod, such that when the piston rod is displaced, the lips always are in sliding contact with respect to the outer circumferential surface. Owing thereto, passage of the pressure fluid from the outer circumferential surface of the piston rod to the side of the cover member can reliably be prevented.

Still further, the lips are formed from a pair of lips separated a predetermined distance along a direction of displacement of the piston rod, wherein the pair of lips extend while being inclined at predetermined angles in directions mutually separating from each other. As a result, one of the lips that extends toward the side of the cylinder tube is caused to abut suitably against the outer circumferential surface of the piston rod, thus making it possible to maintain airtightness of the cylinder chamber, whereas dust or the like adhered to the outer circumferential surface of the piston rod can suitably be removed by the other lip that extends toward the side of the cover member.

The above and other objects, features and advantages of the present invention will become more apparent from the following description when taken in conjunction with the accompanying drawings, in which a preferred embodiment of the present invention is shown by way of illustrative example.

BEST MODE FOR CARRYING OUT THE INVENTION

Figure 1:
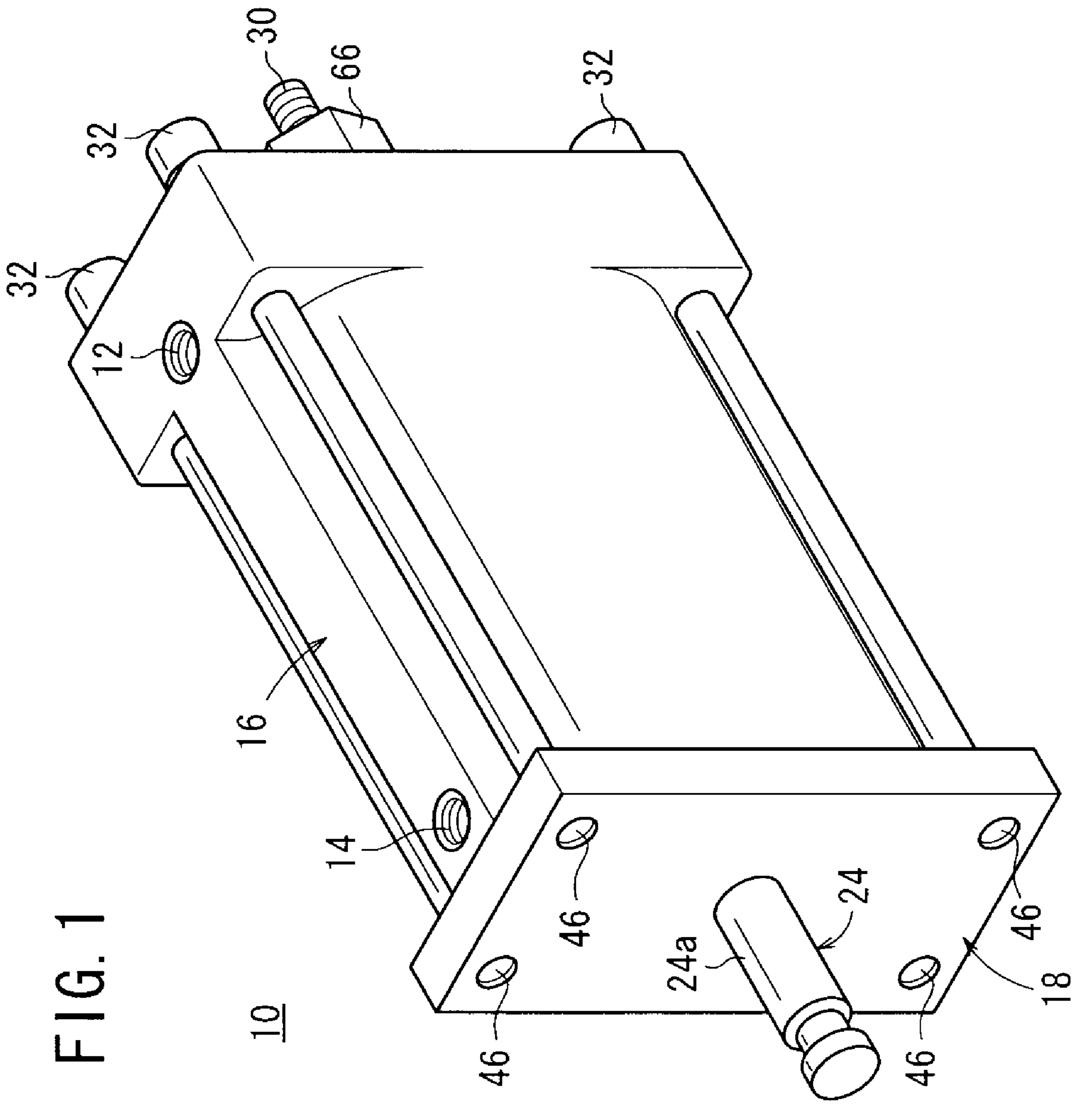
FIG. 1 is an exterior perspective view of a cylinder apparatus, to which a seal structure for a fluid pressure device in accordance with an embodiment of the present invention is applied.

In FIG. 1, reference numeral 10 indicates a cylinder apparatus, in which a seal structure of a fluid pressure device according to an embodiment of the present invention is applied.

Figure 2:
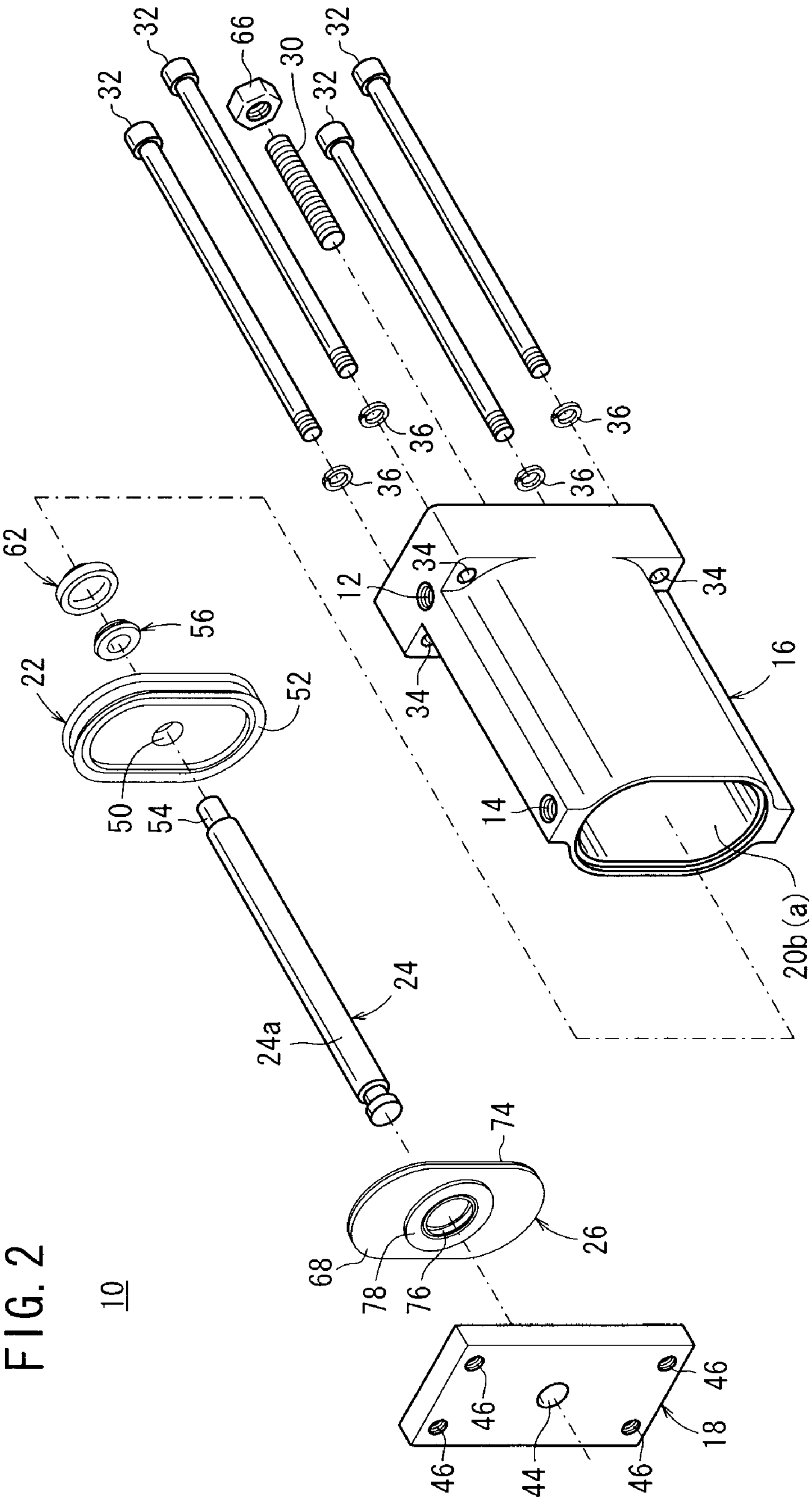
FIG. 2 is an exploded perspective view of the cylinder apparatus shown in FIG. 1.
Figure 3:
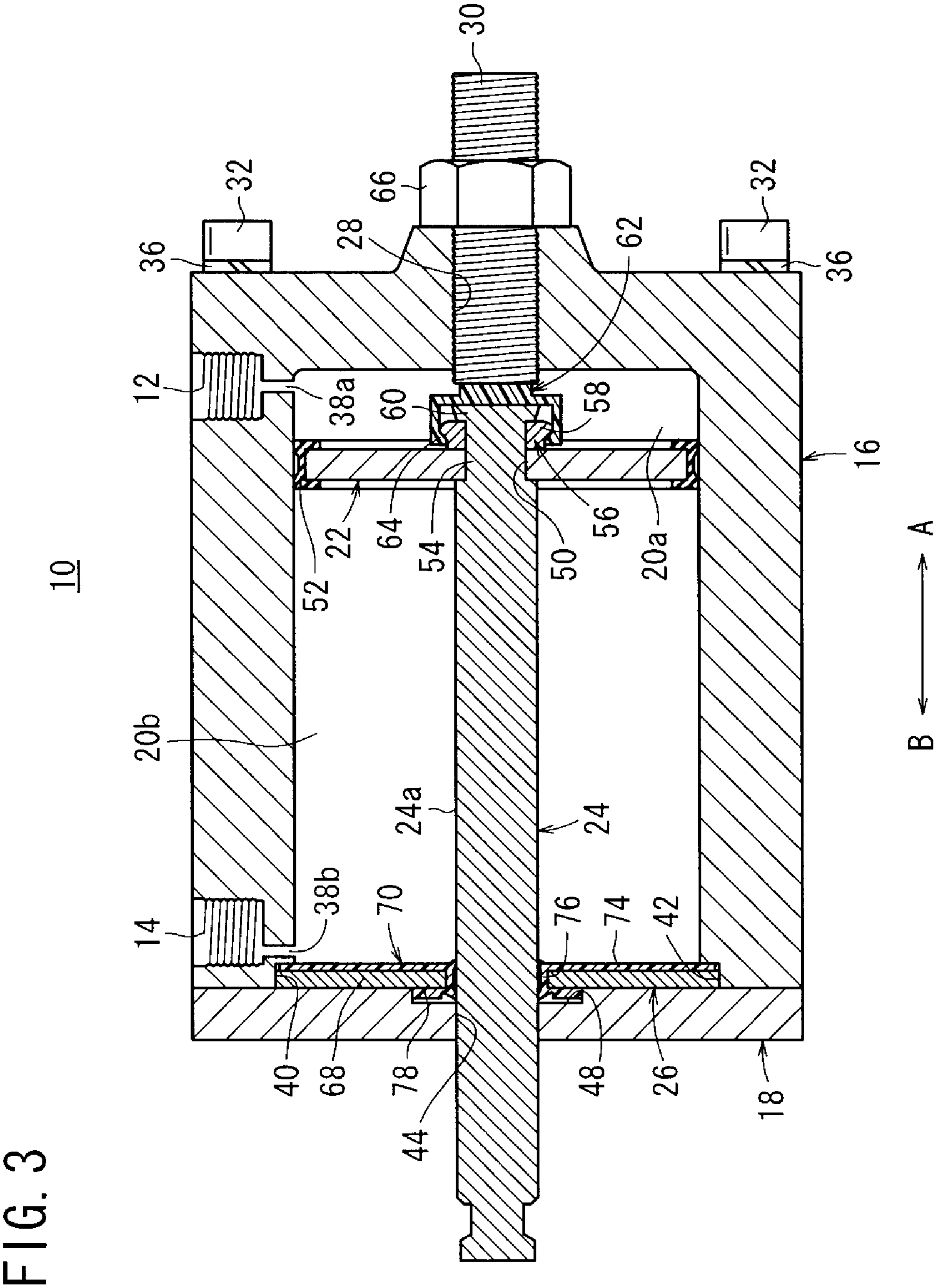
FIG. 3 is an overall vertical cross-sectional view of the cylinder apparatus of FIG. 1.
Figure 4:
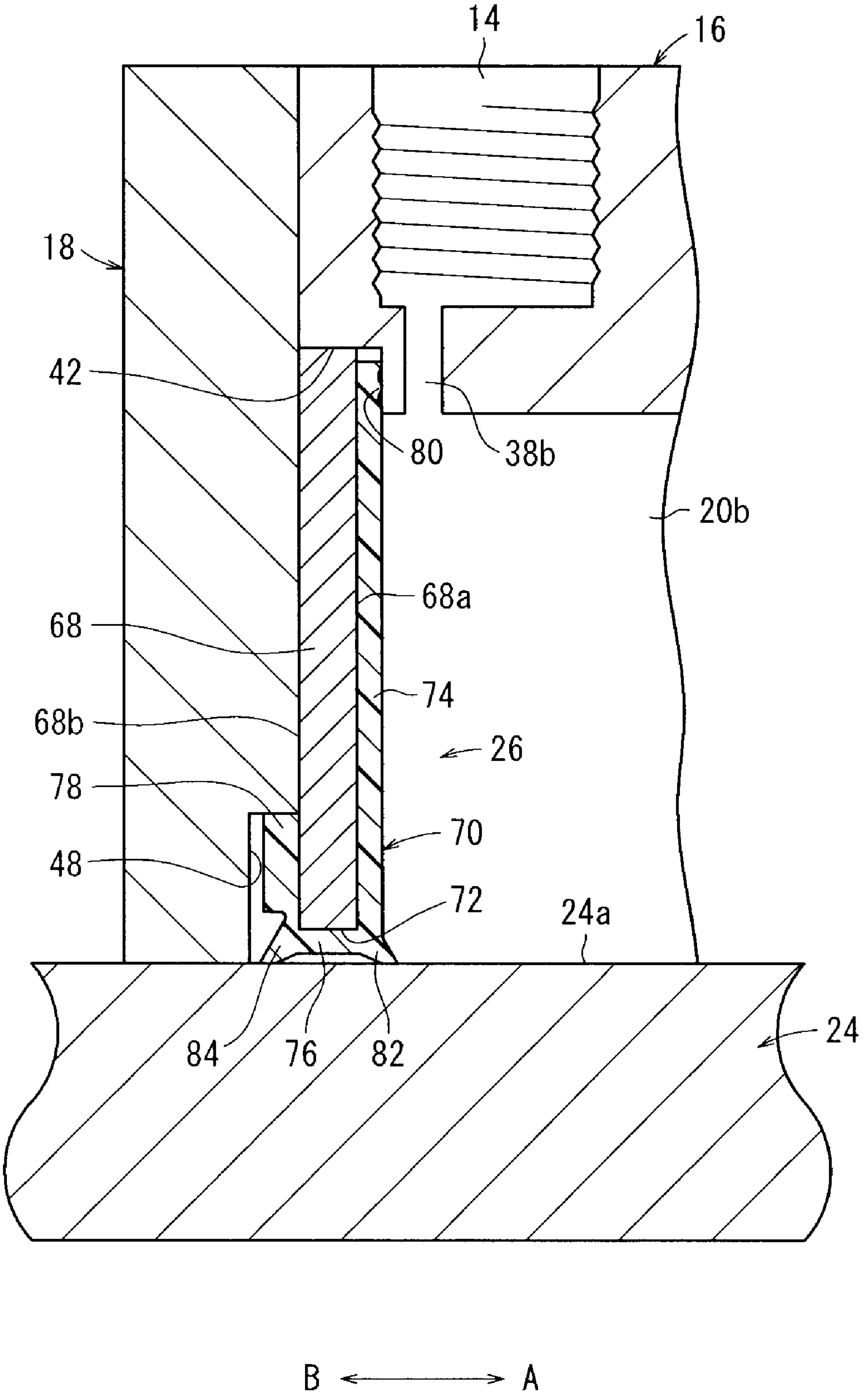
FIG. 4 is an enlarged cross-sectional view of the vicinity of the seal mechanism in the cylinder apparatus of FIG. 3.
Figure 5:
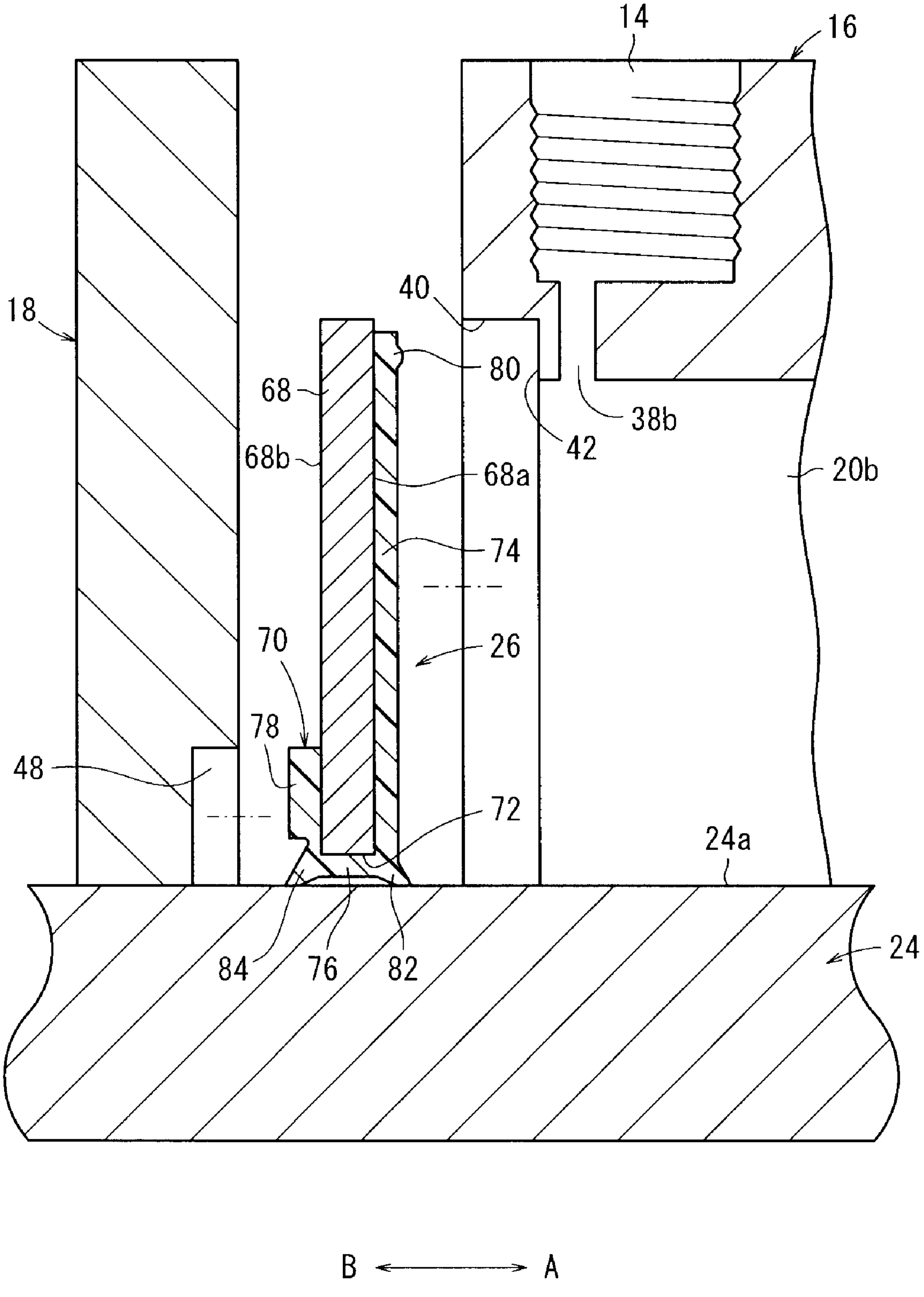
FIG. 5 is an enlarged cross-sectional view showing a disassembled state of the seal mechanism and a rod cover in the cylinder apparatus of FIG. 4.
Figure 6:
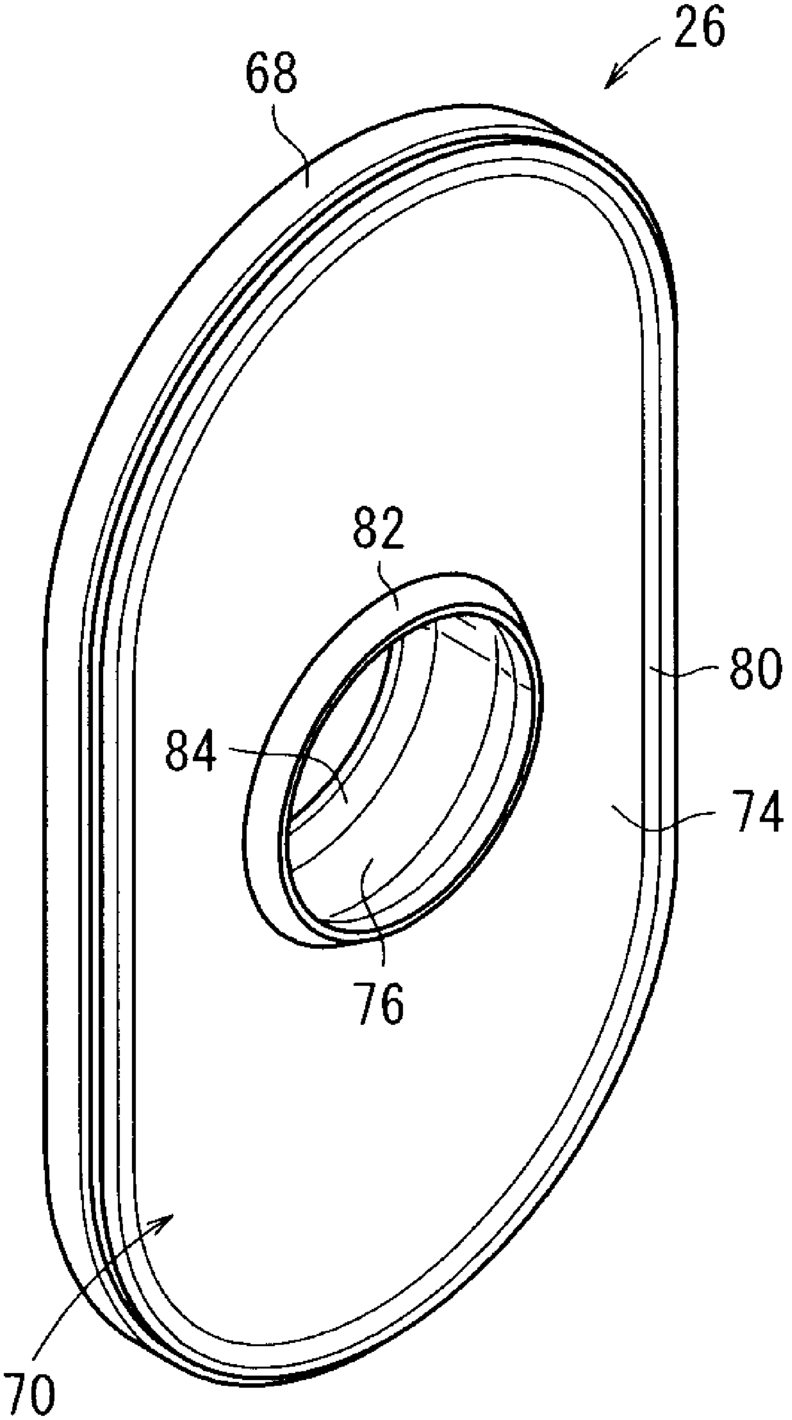
FIG. 6 is a perspective view, wherein the seal mechanism shown in FIG. 2 is viewed from a different direction.

The cylinder apparatus (fluid pressure device) 10, as shown in FIGS. 1 to 3, is made up of a bottomed-shaped cylinder tube 16 having first and second ports 12, 14 separated from each other by a predetermined distance, a rod cover (cover member) 18 that closes an opened end of the cylinder tube 16, cylinder chambers 20*a*, 20*b* formed in a substantially elliptical shape in cross section at the inside of the cylinder tube 16, a piston 22 disposed displaceably along the cylinder chambers 20*a*, 20*b*, a piston rod 24 connected to one end side of the piston 22, and a seal mechanism 26 disposed between the cylinder tube 16 and the rod cover 18 for maintaining airtightness of the cylinder chamber 20*b*.

The cylinder tube 16 is formed from a metal material, for example, wherein a stopper bolt 30 is threaded substantially centrally in one end thereof for enabling adjustment of a displacement amount of the piston 22 through a bolt hole 28. Further, the one end of the cylinder tube 16 is formed with a plurality of through holes 34 at four corners thereof, taking the bolt hole 28 as the center. Connecting bolts 32 are inserted respectively through the through holes 34. The through holes 34 are disposed substantially in parallel with screw holes 46, wherein by threading of the inserted connecting bolts 32 into the rod cover 18, the cylinder tube 16 and the rod cover 18 are connected together. Moreover, annular spring washers 36 are inserted over the connecting bolts 32, so that when the connecting bolts 32 are fastened, the spring washers 36 are gripped between the connecting bolts 32 and the end surface of the cylinder tube 16.

Further, first and second ports 12, 14 are disposed on sides of the cylinder tube 16, separated a predetermined distance from each other in the axial direction (the direction of the arrows A and B) of the cylinder tube 16. The first and second ports 12, 14 communicate respectively with the cylinder chambers 20*a*, 20*b* via communication passages 38*a*, 38*b*. Moreover, the first and second ports 12, 14 are connected by tubes to an unillustrated pressure fluid supply source.

On the other hand, an opening 40 is formed, similarly with a substantially elliptical shape in cross section, on the other end of the cylinder tube 16, the opening 40 having a stepped portion 42, which widens the cylinder tube 16 in a direction substantially perpendicular to the axis thereof. The stepped portion 42 is formed in an elliptical shape in cross section, and widens a predetermined width with respect to the cylinder chambers 20*a*, 20*b* while being formed on an end surface of the cylinder tube 16. Stated otherwise, the stepped portion 42 is formed with a substantially elliptical cross section, recessed a predetermined depth from the other end of the cylinder tube and toward the one end side (in the direction of the arrow A) thereof. In addition, the other end of the cylinder tube 16 is closed by installing the seal mechanism 26 on the stepped portion 42.

The rod cover 18 is formed from a substantially rectangular-shaped plate body, with a rod hole 44 for passage therethrough of the piston rod 24 being formed substantially in the center thereof. In addition, at the four corners of the rod cover 18, taking the rod hole 44 as the center, a plurality of screw holes 46 are formed into which connecting bolts 32 are threaded. The screw holes 46 are positioned respectively at positions facing the through holes 34 when the rod cover 18 is installed onto the cylinder tube 16. In addition, by threading the connecting bolts 32 that are inserted through the through holes 34 of the cylinder tube 16 respectively into the screw holes 46 of the rod cover 18, the rod cover 18 is connected with respect to the other end of the cylinder tube 16.

Further, the rod cover 18 has a recess 48 in which a portion of the seal mechanism 26 is inserted, on an end surface forming a cylinder tube 16 side thereof (in the direction of the arrow A). The recess 48, which is recessed a predetermined depth into the rod cover 18, is formed in a substantially circular shape in cross section, taking the rod hole 44 as the center.

The piston 22 is formed in a substantially elliptical shape in cross section, corresponding to the shape of the cylinder chambers 20*a*, 20*b* and is inserted onto one end side (in the direction of the arrow A) of the piston rod 24 via a hole 50 formed substantially in the center thereof. A ring-shaped piston packing 52 is installed on an outer peripheral surface of the piston 22. The piston packing 52 abuts against an interior wall surface of the cylinder chambers 20*a*, 20*b* and is slidably displaceable along the interior wall surface when the piston 22 is displaced. As a result, airtightness of the cylinder chamber 20*a* on one end surface side of the piston 22 (in the direction of the arrow A), as well as airtightness of the other cylinder chamber 20*b* on the other end surface side of the piston 22 (in the direction of the arrow B), are maintained mutually.

The piston rod 24 is formed into a shaft shape with a substantially constant diameter. One end of the piston rod 24 is formed with a radially reduced smaller diameter portion 54, which is reduced radially inwardly over a predetermined length thereof. The piston 22 is inserted over the smaller diameter portion 54, together with a cylindrical holder 56, which also is inserted over the smaller diameter portion 54 adjacent to the piston 22. In addition, after the holder 56 has been inserted over the smaller diameter portion 54, by applying a pressing force with respect to the end of the smaller diameter portion 54, the smaller diameter portion 54 is plastically deformed and expands in diameter radially outwardly. As a result, the piston 22 and holder 56 are caulked together with respect to the end of the piston rod 24. Further, the holder 56 includes a claw portion 58, which is expanded in diameter radially outwardly on an opposite side end thereof from the piston 22.

A damper 62 formed of an elastic material, for example urethane or the like, is installed on the expanded diameter flange 60. The damper 62 is substantially U-shaped in cross section covering the flange 60, wherein a hook portion 64 thereof, which extends toward the piston 22 (in the direction of the arrow B), engages with the claw portion 58 of the holder 56. As a result, the damper 62 is installed integrally in a state of abutment on an end surface of the flange 60, which makes up the other end of the piston rod 24.

In addition, the damper 62 is disposed so as to face the stopper bolt 30 that is screw-engaged with the cylinder tube 16. Owing thereto, by abutment of the damper 62 against the stopper bolt 30 under a displacement action of the piston 22, displacement is regulated in the axial direction (the direction of the arrows A and B) of the piston 22 and the piston rod 24, together with absorbing shocks that are imparted to the piston rod 24. That is, the stopper bolt 30 functions as a stopper for regulating the displacement amount of the piston 22.

Further, by rotating and threading the stopper bolt 30 with respect to the cylinder tube 16, and thereby varying the amount at which the stopper bolt 30 projects into the cylinder chamber 20*a* (in the direction of the arrow B), the displacement amount of the piston 22 can be made freely adjustable. Moreover, after the displacement amount of the piston 22 has been adjusted by the stopper bolt 30, a lock nut 66, which is screw-engaged with the stopper bolt 30, is rotated and threaded, and by abutment of the lock nut 66 against the end surface of the cylinder tube 16, further displacement of the stopper bolt 30 is prevented.

As shown in FIGS. 3 to 6, the seal mechanism 26 is disposed between the other end of the cylinder tube 16 and the rod cover 18. The seal mechanism 26 includes a plate (base body) 68, which is substantially elliptically shaped in cross section, and a seal member 70, which is arranged on one side surface of the plate 68 (in the direction of the arrow A) and is gripped between the plate 68 and the cylinder tube 16.

The plate 68 has a substantially constant thickness and is formed, for example, from a metal material. The outer peripheral region thereof engages with the stepped portion 42 of the cylinder tube 16. Further, an insertion hole 72 through which the piston rod 24 is inserted is formed substantially centrally in the plate 68, wherein the inner circumferential diameter of the insertion hole 72 is set so as to be slightly greater than the diameter of the piston rod 24.

The aforementioned plate 68 is not limited to being formed from a metal material and, for example, may also be formed from a hardened resin material.

The seal member 70 is formed in a substantially elliptical shape in cross section from an elastic material (e.g., rubber, urethane resin), corresponding to the cross sectional shape of the plate 68, and is adhered with respect to a side surface of the plate 68 through an adhesive or the like. The seal member 70 includes a sheet member (first seal element) 74 disposed on one side surface 68*a* (in the direction of the arrow A) of the plate 68 facing the piston 22, a packing (second seal element) 76 disposed on an inner peripheral region of the plate 68 and which slidably contacts an outer circumferential surface 24*a* of the piston rod 24, and a guide member 78 disposed on the other side surface 68*b* of the plate 68, on the side thereof facing the rod cover 18 (in the direction of the arrow B).

The sheet member 74 is formed with a substantially constant thickness. An outer circumferential region of the sheet member 74 has a protrusion (first seal element) 80 (see FIG. 5) formed thereon, which projects annularly toward a side of the piston 22 (in the direction of the arrow A). The protrusion 80 is formed at a position facing an end surface of the cylinder tube 16, when the seal mechanism 26 is installed in the stepped portion 42 of the cylinder tube 16. More specifically, when the seal mechanism 26 including the seal member 70 is installed between the cylinder tube 16 and the rod cover 18, the protrusion 80 is pressed and collapsed while abutting against an end surface of the stepped portion 42 in the cylinder tube 16. As a result, an airtight condition between the cylinder tube 16 and the rod cover 18 is reliably maintained. Stated otherwise, the protrusion 80 on the sheet member 74 functions as a gasket, which is capable of preserving airtightness between the cylinder tube 16 and the rod cover 18.

The protrusion 80 is not limited to being disposed at a position facing toward the side of the cylinder tube 16. For example, it is also acceptable if the protrusion 80 is disposed on the side of the rod cover 18, or protrusions may be provided respectively on the side of the cylinder tube 16 as well as on the side of the rod cover 18.

On the other hand, a packing 76, which extends toward the side of the plate 68 (in the direction of the arrow B) substantially perpendicular to the extending direction of the sheet member 74, is provided on an inner circumferential region of the sheet member 74. The packing 76 is inserted through an insertion hole 72 from one side surface 68*a* toward the other side surface 68*b* of the plate 68, and has a pair of first and second lips 82, 84 that project at predetermined angles toward the piston rod 24. The first lip 82 is arranged at a lower portion of the sheet member 74, and is formed so as to project toward the side of the piston 22 (in the direction of the arrow A). On the other hand, the second lip 84 is arranged at a lower portion of the aforementioned guide member 78, and is formed so as to project toward the side of the rod cover 18 (in the direction of the arrow B). That is, the first lip 82 and the second lip 84 project at predetermined angles in directions separating mutually away from each other, taking the region inserted in the insertion hole 72 as the center, and slide respectively in contact with the outer circumferential surface 24*a* of the piston rod 24. The packing 76 is adhered with respect to an inner peripheral surface of the insertion hole 72.

Airtightness between the exterior of the cylinder tube 16 and the cylinder chambers 20*a*, 20*b* is maintained by abutment of the first lip 82 against the outer circumferential surface 24*a* of the piston rod 24. The second lip 84 functions as a scraper that prevents dust and the like, which becomes adhered to the piston rod 24 when the piston rod 24 projects outwardly from the cylinder tube 16, from penetrating into the interior of the cylinder tube 16.

Stated otherwise, the packing 76 including the first and second lips 82, 84 functions as a rod packing, which slidably contacts the outer circumferential surface 24*a* of the piston rod 24, and is capable of maintaining an airtight condition inside the cylinder tube 16.

Further, the guide member 78 extends for a predetermined radius, radially outwardly on the outer peripheral side of the second lip 84 constituting the packing 76. The guide member 78 is formed in a disk shape, and is adhered to the other side surface 68*b* of the plate 68. In addition, when the seal mechanism 26 is installed between the cylinder tube 16 and the rod cover 18, the guide member 78 is accommodated within the recess 48 of the rod cover 18. Moreover, the guide member 78 provides a reinforcement, which even more securely and firmly mounts the seal member 70 with respect to the plate 68.

In this manner, the seal member 70 is mounted integrally so as to cover the inner circumferential region of the plate 68 with a substantially U-shaped configuration through the insertion hole 72.

The cylinder apparatus 10, to which the seal structure for a fluid pressure device according to the embodiment of the present invention is applied, is basically constructed as described above. Next, a description shall be given of a case in which the seal mechanism 26 is assembled into the cylinder apparatus 10.

First, the piston 22 and the piston rod 24 are inserted into the cylinder chambers 20*a*, 20*b* of the cylinder tube 16, and from the other end side of the piston rod 24 (in the direction of the arrow B), the seal mechanism 26 is inserted via the insertion hole 72 such that the sheet member 74 of the seal member 70 becomes positioned on the side of the cylinder tube 16 (in the direction of the arrow A). More specifically, the piston rod 24 is inserted through the insertion hole 72 of the plate 68, as well as through the inside of the packing 76 of the seal member 70, which is disposed in the insertion hole 72. Owing thereto, the first and second lips 82, 84 of the packing 76 abut against the outer circumferential surface 24*a* of the piston rod 24.

In addition, the seal mechanism 26 including the seal member 70 and the plate 68 engages with the stepped portion 42 of the cylinder tube 16, and the protrusion 80 formed on the sheet member 74 of the seal member 70 abuts against an end surface of the stepped portion 42.

Lastly, the rod cover 18 is installed onto the cylinder tube 16 from the side of the guide member 78 of the seal mechanism 26, and by threading the plurality of connecting bolts 32, which are inserted through the cylinder tube 16, into the screw holes 46, the seal mechanism 26 is gripped and held between the rod cover 18 and the cylinder tube 16.

More specifically, because the first and second lips 82, 84 of the packing 76 that constitutes the seal member 70 normally abut with respect to the outer circumferential surface 24*a* of the piston rod 24, airtightness within the cylinder chamber 20*b* is reliably maintained, and external leakage of pressure fluid from between the piston rod 24 and the rod cover 18 also is prevented.

Further, since the protrusion 80 of the sheet member 74 constituting the seal member 70 abuts against the stepped portion 42 of the cylinder tube 16, airtightness within the cylinder chamber 20*b* is reliably maintained, and leakage of pressure fluid from between the cylinder tube 16 and the rod cover 18 is prevented.

In this manner, leakage of pressure fluid from between the cylinder tube 16 and the rod cover 18, as well as leakage of pressure fluid from between the rod cover 18 and the piston rod 24, can be prevented by the seal member 70 that constitutes the seal mechanism 26. Owing thereto, the number of parts can be reduced in comparison with a conventional fluid pressure device in which airtightness is maintained by separately providing a packing member and o-rings, and because the seal mechanism 26 including the seal member 70 is formed as an integral structure, the mechanism can easily be assembled into the cylinder apparatus 10, and hence assembly with respect to the cylinder apparatus 10 can be improved. Along therewith, an improvement in production and manufacturability of the cylinder apparatus 10 is enabled.

Further, as a result of installing the seal member 70, which is made of an elastic material, integrally onto the plate 68 made of a metal material, since the plate 68 has a predetermined hardness, assembly thereof becomes more favorable compared to the case of handling the seal member 70 as an individual unit.

Next, operations of the cylinder apparatus 10 in which the aforementioned seal mechanism 26 is assembled shall briefly be described.

Figure 7:
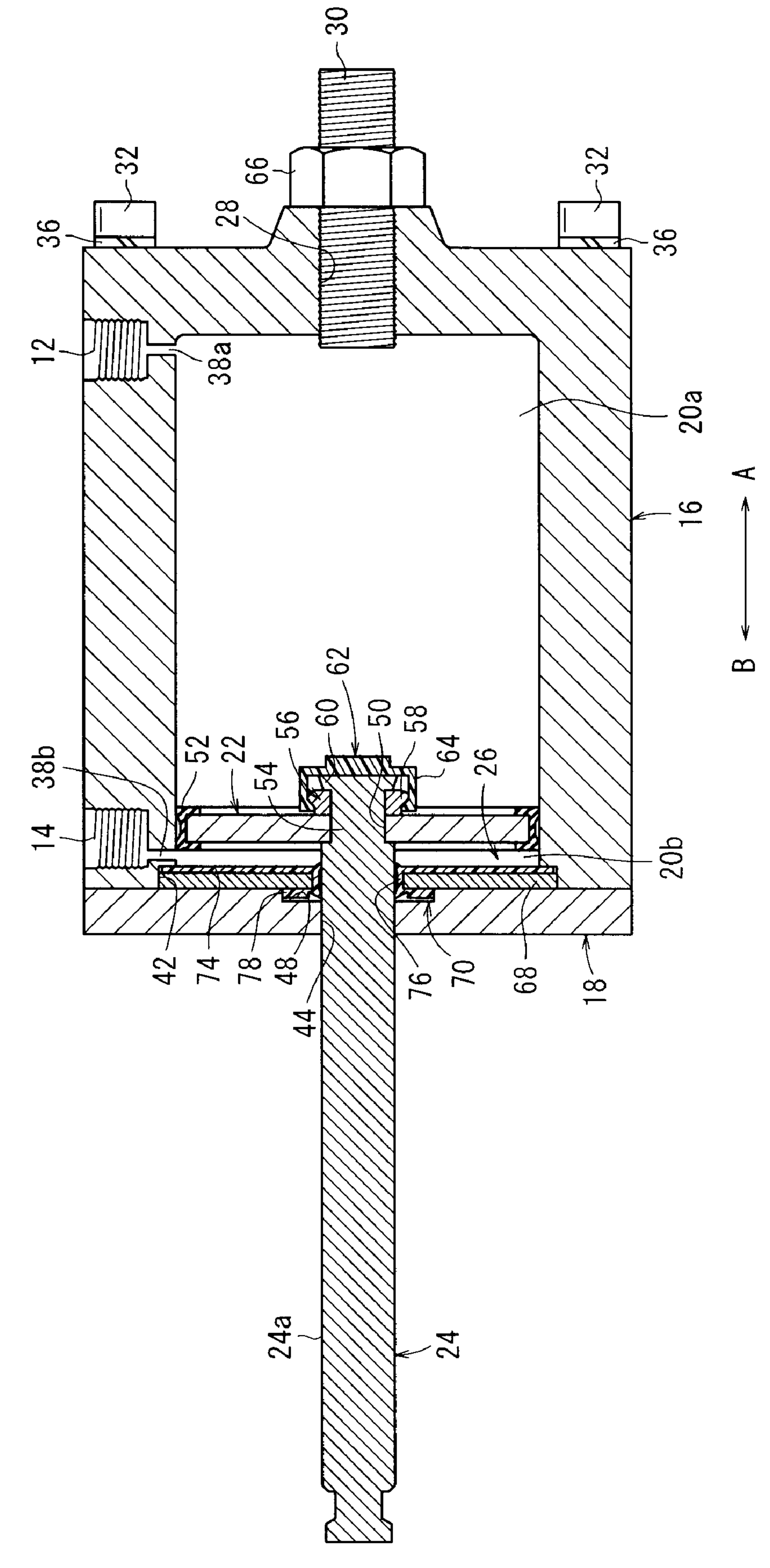
FIG. 7 is an overall vertical cross-sectional view showing a state in which a piston is displaced toward a side of the rod cover in the cylinder apparatus of FIG. 3.

First, in a state in which the piston shown in FIG. 3 is displaced in a direction (the direction of the arrow A) to separate from the rod cover 18, as a result of supplying a pressure fluid to the first port 12 from an unillustrated pressure fluid supply source, the pressure fluid is introduced into one of the cylinder chambers 20*a* through the communication passage 38*a*. In this case, the second port 14 is placed in a state of being open to atmosphere. In addition, under a pressing action of the pressure fluid supplied to the one cylinder chamber 20*a*, the piston 22 is displaced integrally together with the piston rod 24 (in the direction of the arrow B) toward the rod cover 18 (see FIG. 7). At this time, airtightness of the one cylinder chamber 20*a* is reliably maintained by the piston packing 52 installed on the piston 22.

Next, under a switching action of an unillustrated directional control valve, the pressure fluid supplied to the first port 12 is switched and supplied to the second port 14. At this time, the first port 12 is placed in a state of being open to atmosphere. In addition, the pressure fluid is supplied from the second port 14 to the other cylinder chamber 20*b* through the communication passage 38*b*, and under a pressing action of the pressure fluid, the piston 22 is displaced in a direction (the direction of the arrow A) to separate from the rod cover 18. As a result thereof, the piston rod 24 is displaced integrally therewith, wherein a portion of the piston rod 24 is accommodated inside the cylinder tube 16. At this time, leakage of the pressure fluid, which is introduced into the other cylinder chamber 20*b*, from between the piston rod 24 and the rod cover 18 is prevented by the packing 76 that makes up the seal mechanism 26, and moreover, leakage thereof from between the rod cover 18 and the cylinder tube 16 also is prevented by the protrusion 80 of the sheet member 74. Furthermore, since dust and the like that is adhered to the outer circumferential surface 24*a* of the piston rod 24 is suitably removed by the second lip 84 constituting the seal mechanism 26, such dust does not penetrate into the cylinder chamber 20*b*.

Finally, the piston 22 is further displaced until the damper 62 installed on the end of the piston rod 24 abuts against an end of the stopper bolt 30, whereby the displacement of the piston 22 is regulated (see FIG. 3).

In the above-described seal mechanism 26, a structure is provided in which the sheet member 74 and the protrusion 80, functioning as a gasket, and the packing 76 that functions as a rod packing are disposed integrally with respect to the seal member 70. However, the invention is not limited by such features. For example, a structure may also be provided in which a bush (not shown), which displaceably supports the piston rod 24 along the axial direction, is disposed integrally with the seal member 70. Furthermore, the seal mechanism 26 may also be disposed integrally with the rod cover 18, whereby ease of assembly of the seal mechanism 26 with respect to the cylinder apparatus 10 can be even more greatly improved.

The seal structure for a fluid pressure device according to the present invention is not limited to the aforementioned embodiment, but various other features and structures may be adopted without deviating from the essential gist of the invention.

The invention claimed is:

1. A seal structure in a fluid pressure device having a cylinder tube including an inner cylinder surface defining a chamber in the cylinder tube, an open end of the cylinder tube and a cover member that closes said open end, said fluid pressure device further having a piston displaceable along the cylinder chamber while in sealing contact with the inner cylinder surface, the piston being mounted to a piston rod that extends through the cover member, the seal structure comprising:

a rigid plate shaped base body formed in a plate shape;

a seal member formed from an elastic material and installed integrally on said base body, wherein said base body and seal member are installed in the opening end of said cylinder tube, wherein said base body and said seal member are together gripped between said cylinder tube and said cover member to form a first seal element that airtightly seals the joint between said cylinder tube and said cover member, wherein said base body and said seal member both extend radially inward from said inner cylinder surface along which the piston is displaceable, and toward said piston rod, and wherein said seal member further comprises a second seal element surrounding and engaging an outer circumferential surface of said piston rod to airtightly seal the chamber in the cylinder tube from the location where the piston rod extends through the cover member.

2. The seal structure in a fluid pressure device according to claim 1, wherein said first seal element is formed with a protrusion which projects toward at least one of said cylinder tube and said cover member.

3. The seal structure in a fluid pressure device according to claim 2, wherein said second seal element is formed with lips which project toward and abut with an outer circumferential surface of said piston rod, such that when said piston rod is displaced, said lips always are in sliding contact with respect to said outer circumferential surface.

4. The seal structure in a fluid pressure device according to claim 3, wherein said lips comprise a first lip and a second lip separated by a predetermined distance along a direction of displacement of said piston rod, and wherein said first and second lips extend while being inclined at predetermined angles in directions mutually separating from each other.

5. The seal structure in a fluid pressure device according to claim 4, wherein said first lip is disposed on a side facing said piston for maintaining airtightness between said piston rod and said cylinder tube, and said second lip is disposed on a side facing said cover member for preventing dust or the like that adheres to said piston rod from penetrating into said cylinder tube.

6. The seal structure in a fluid pressure device according to claim 4, wherein said seal member further comprises a guide member provided adjacent to said second lip and at a side of said base body facing said cover member.

7. The seal structure in a fluid pressure device according to claim 6, wherein said seal member covers an end of said base body facing said piston rod, such that the end of said base body is covered by said first seal element, said second seal element and said guide member.

8. The seal structure in a fluid pressure device according to claim 1, wherein a stepped portion recessed a predetermined depth is disposed on said opening end of said cylinder tube, said base body and said seal member being inserted into said stepped portion while being gripped by said cover member.

9. The seal structure in a fluid pressure device according to claim 8, wherein said base body is formed in an elliptical shape in cross section corresponding to the opening end of said cylinder tube, and said seal member is formed in an elliptical shape in cross section covering an end surface and an inner circumferential region of said base body.

* * * * *